UNITED STATES PATENT OFFICE.

JOHN L. DUFFEE, OF WASHINGTON, D. C., FOR HIMSELF, AND JOHN H. JOHNSON, ASSIGNEE OF ONE-THIRD INTEREST.

IMPROVEMENT IN BRONZING AND GILDING.

*Specification forming part of Letters Patent No.* 102,198, *dated April* 19, 1870; *reissue No.* 3,962, *dated May* 3, 1870.

*To all whom it may concern:*

Be it known that I, JOHN L. DUFFEE, of the city and county of Washington, in the District of Columbia, have invented a new and useful Composition for Gilding and Ornamental Purposes; and I do hereby declare the following to be a full, clear, and exact description of the method of compounding and using the same.

My invention relates to a composition for gilding and ornamenting articles, which can be applied to any surface or material with as much facility as paint, and at far less cost than the present mode of gilding; and it consists in the production of a liquid gilding of any shade or color, applied by means of a brush, without sizing or preparing the article; and, in the employment in said compound, in combination with gilding or bronze, representing gold, silver, or other metals, of one or more gums, used with and dissolved by alcohol, ether, and naphtha, in proper proportions, and used with the powder, so as to produce a solution which will readily flow, adhere to the surface, and become perfectly hard.

The gums which I have found best adapted to produce the adhesive, hardening, and polishing effect of the metallic powder are gum-shellac, gum-mastic, gum-sandarac, and gum-dammar.

These gums, being insoluble in water, are readily cut and dissolved by alcohol, and any or all of them may be used. I prefer, however, to use all of them in equal or unequal quantities as they act in conjunction with the metal or other powder to produce a more compact and polished surface.

The ether and naphtha are used in equal or unequal proportions, as desired, but of less quantity than the alcohol, and are to produce a very rapid evaporation, while the naphtha is to increase the luster of the powder.

The rapid evaporation of the liquid causes the metal powder and the gum to set quickly and become perfectly hard, and aids in giving a fine gloss as the brush is passed over it while the powder is in a semi-solidified condition.

The proportions of the several ingredients which form the mixing-fluid may be of equal or unequal parts, and the proportions of the gum or gums, when all are used, may be of equal or unequal parts, so as to produce a liquid that will easily spread on any surface.

The liquid may be mixed by itself and kept in bottles or vials, and used with the metal powder in quantities that will not be materially affected by evaporation.

The special feature of this liquid gilding consists in its general application, cheapness, durability, and its use by any person upon wood, glass, stone, metal surface, and anything that will receive paint.

The gilding or bronzing material is what is known as the Bessemer or other metallic powder, and the mixing material may be poured upon it into the vessel and stirred by the brush before being used.

Gums shellac and dammar possessing polishing as well as adhesive qualities, their use is, therefore, preferable.

Any surface coated with this gilding-fluid may be cleansed with soap and water without affecting it in the least or impairing its brilliancy, and it is especially valuable in the gilding or regilding of chandeliers, mirror-frames, and, on account of its cheapness, can be used to gild any desirable household articles.

It is also especially adapted to lettering upon glass, thus dispensing with the costly gold-leaf now used for that purpose. It may also be applied to machinery and ordnance of any description, to prevent rusting.

It makes no difference whether the surface or article be greasy, rusty, rough, or smooth, the gilding or bronze will take equally well and bright; but a smooth surface is preferable. The only requirement in its application is that the surface or article must be dry.

Silver and copper gildings are produced by those powders, but a light brown and deep bronzing is produced by mixing copper, gold, and silver bronzes in suitable proportions. Other suitable gums than those mentioned may be used, if deemed expedient.

I am aware that bronze has been applied to various articles; but the surface or article must be previously prepared with sizing and burnished with a tool for the purpose after the bronze is applied and perfectly dry; but this method requires much labor and care to produce a smooth polished surface, which greatly enhances its cost, while the application of my improved gilding or bronzing compound requires no preparation of sizing, priming, cleaning, or subsequent burnishing or polishing, and requires only to be properly spread and smoothed with the brush so as to cover the surface of the article.

A single coat of this liquid gilding of proper body I have found sufficient for nearly all purposes, but a second thinner coating may be used to increase the luster and render the surface smoother.

When soft or composition metals are used the surface or article may, when bronzed, be covered by a coat of light varnish.

To make a pint of the solution the proportions may consist of half-pint of alcohol, four ounces of gum-shellac, one ounce of gum-sandarac, half-ounce of gum-dammar, half-ounce of gum-mastic, one ounce of ether, and one ounce of naphtha.

The consistency of the solution may be varied by changing the above quantities, and used with more or less powder, to suit the material to which it is to be applied.

Having described my invention, I claim—

1. In a gilding compound having for its base any bronzing or gilding powder, the use of alcohol, ether, and naphtha, and one or more adhesive polishing-gums, for the purpose and applied as herein described.

2. The liquid solution, compounded as herein described, and used with any metallic bronzing or gilding powders.

3. In a liquid gilding compound prepared and used as described, producing different shades or tints by the admixture of different colors of metallic powders, as herein described.

4. The liquid bronze or gilding compound herein described, as a new article of manufacture.

JOHN L. DUFFEE.

Witnesses:
T. H. UPPERMAN,
A. E. H. JOHNSON.